US009140128B2

(12) United States Patent
Aggarwala et al.

(10) Patent No.: US 9,140,128 B2
(45) Date of Patent: Sep. 22, 2015

(54) ENDWALL CONTOURING

(71) Applicant: United Technologies Corporation, Hartford, CT (US)

(72) Inventors: Andrew S. Aggarwala, Vernon, CT (US); Eric A. Grover, Tolland, CT (US)

(73) Assignee: United Technologes Corporation, Hartford, CT (US)

( * ) Notice: Subject to any disclaimer, the term of this patent is extended or adjusted under 35 U.S.C. 154(b) by 476 days.

(21) Appl. No.: 13/663,894

(22) Filed: Oct. 30, 2012

(65) Prior Publication Data
US 2014/0090380 A1    Apr. 3, 2014

Related U.S. Application Data

(60) Provisional application No. 61/706,989, filed on Sep. 28, 2012.

(51) Int. Cl.
*F02C 3/04* (2006.01)
*F01D 5/02* (2006.01)
*F01D 9/04* (2006.01)
*F01D 5/14* (2006.01)

(52) U.S. Cl.
CPC .......... *F01D 5/143* (2013.01); *F05D 2240/303* (2013.01); *Y02T 50/673* (2013.01)

(58) Field of Classification Search
CPC ............. F01D 5/02; F01D 5/06; F01D 5/143; F01D 5/145; F01D 2240/303; Y02T 50/673
See application file for complete search history.

(56) References Cited

U.S. PATENT DOCUMENTS

| 3,529,631 | A | 9/1970 | Riollet |
| 4,465,433 | A | 8/1984 | Bischoff |
| 6,283,713 | B1 | 9/2001 | Harvey et al. |
| 6,837,679 | B2 * | 1/2005 | Kawarada et al. ............ 415/191 |
| 6,969,232 | B2 | 11/2005 | Zess et al. |
| 7,134,842 | B2 | 11/2006 | Tam et al. |
| 7,220,100 | B2 | 5/2007 | Lee et al. |
| 7,249,933 | B2 * | 7/2007 | Lee et al. ..................... 416/97 R |
| 7,354,243 | B2 * | 4/2008 | Harvey ......................... 415/191 |
| 7,690,890 | B2 | 4/2010 | Aotsuka et al. |
| 7,887,297 | B2 | 2/2011 | Allen-Bradley et al. |
| 8,727,716 | B2 * | 5/2014 | Clements et al. ............. 415/191 |
| 2007/0258818 | A1 | 11/2007 | Allen-Bradley et al. |
| 2007/0258819 | A1 | 11/2007 | Allen-Bradley et al. |
| 2008/0232968 | A1 | 9/2008 | Nguyen |

(Continued)

OTHER PUBLICATIONS

International Search Report and Written Opinion for related International Application No. PCT/US13/54949; report dated May 13, 2014.

*Primary Examiner* — Igor Kershteyn
(74) *Attorney, Agent, or Firm* — Miller, Matthias & Hull LLP

(57) ABSTRACT

An airfoil array is disclosed. The airfoil array may include an endwall, and a plurality of airfoils radially projecting from the endwall. Each airfoil may have a first side and an opposite second side extending axially in chord between a leading edge and a trailing edge. The airfoils may be circumferentially spaced apart on the endwall thereby defining a plurality of flow passages between adjacent airfoils. The airfoil array may further include a convex profiled region extending from the endwall near the leading edge of at least one of said plurality of airfoils, and a concave profiled region in the endwall near a middle of at least one of said plurality of flow passages.

18 Claims, 3 Drawing Sheets

(56) References Cited

U.S. PATENT DOCUMENTS

| | | |
|---|---|---|
| 2010/0143139 A1 | 6/2010 | Pandey et al. |
| 2010/0158696 A1 | 6/2010 | Pandey et al. |
| 2010/0254797 A1 | 10/2010 | Grover et al. |
| 2011/0044818 A1 | 2/2011 | Kuhne et al. |
| 2012/0201688 A1 | 8/2012 | Mahle et al. |

\* cited by examiner

ENDWALL CONTOURING

CROSS-REFERENCE TO RELATED APPLICATIONS

The present disclosure claims the benefit of priority from U.S. Provisional Patent Application Ser. No. 61/706,989, filed on Sep. 28, 2012, which is incorporated herein by reference.

FIELD OF THE DISCLOSURE

The present disclosure relates generally to airfoil arrays utilized in gas turbine engines and, more particularly, to endwall contouring.

BACKGROUND OF THE DISCLOSURE

Gas turbine engines typically include a compressor section, a combustor section, and a turbine section, with an annular flow path extending axially through each. Initially, air flows through the compressor where it is compressed or pressurized. The combustor then mixes and ignites the compressed air with fuel, generating hot combustion gases. These hot combustion gases are then directed by the combustor to the turbine where power is extracted from the hot gases by causing blades of the turbine to rotate.

Some sections of the engine include airfoil arrays. Air within the engine moves through fluid flow passages in the arrays. The fluid flow passages are established by adjacent airfoils projecting from laterally extending endwalls. Near the endwalls, the fluid flow is dominated by a flow phenomenon known as a horseshoe vortex, which forms as a result of the endwall boundary layer separating from the endwall as the gas approaches the leading edges of the airfoils. The separated gas reorganizes into the horseshoe vortex. There is a high loss of efficiency associated with the vortex, and this loss is referred to as "secondary" or endwall loss. Accordingly, there exists a need for a way to mitigate or reduce endwall losses.

SUMMARY OF THE DISCLOSURE

According to one embodiment of the present disclosure, an airfoil array is disclosed. The airfoil array may comprise an endwall, and a plurality of airfoils radially projecting from the endwall. Each airfoil may have a first side and an opposite second side extending axially in chord between a leading edge and a trailing edge. The airfoils may be circumferentially spaced apart on the endwall thereby defining a plurality of flow passages between adjacent airfoils. The airfoil array may further comprise a convex profiled region extending from the endwall near the leading edge of at least one of said plurality of airfoils, and a concave profiled region in the endwall near a middle of at least one of said plurality of flow passages.

In a refinement, the convex profiled region may be adjacent to the leading edge of the airfoil.

In another refinement, a local maximum in radial extent of the convex profiled region may be positioned axially upstream of the leading edge of the airfoil.

In another refinement, each airfoil may have an axial chord and each flow passage may have a passage width. A local minimum in radial extent of the concave profiled region may be disposed near mid-chord of the airfoils and near mid-passage of the flow passage.

In another refinement, the concave profiled region may extend axially along a majority of an axial chord of the airfoil.

In another refinement, each airfoil may have an axial chord, and a local minimum in radial extent of the concave profiled region may be disposed between about 30% to about 80% of the axial chord.

In another refinement, each passage may have a passage width, and a local minimum in radial extent of the concave profiled region may be disposed between about 30% to about 70% of the passage width.

In another refinement, the first side may be a pressure side of an airfoil.

In yet another refinement, the opposite second side may be a suction side of an airfoil.

According to another embodiment, a gas turbine engine is disclosed. The gas turbine engine may comprise a compressor section, a combustor section downstream of the compressor section, and a turbine section downstream of the combustor section. One of the compressor section and the turbine section may have at least one airfoil array including a plurality of airfoils circumferentially spaced apart and projecting radially from an endwall, the airfoils establishing a plurality of flow passages, each airfoil having a first side, an opposite second side, a leading edge, and a trailing edge. The endwall may have a convex profiled surface near the leading edge of at least one of said plurality of airfoils and a concave profiled surface near a center of at least one of said plurality of flow passages.

In a refinement, the convex profiled surface may gradually increase in radial height to a local maximum in radial extent from a surface of the endwall adjacent to the convex profiled surface.

In a related refinement, the local maximum in radial extent may be disposed adjacent to and axially upstream of the leading edge of the airfoil.

In another refinement, a radial height of the convex profiled surface may decrease as the convex profiled surface extends axially upstream from the leading edge of the airfoil.

In another refinement, the concave profiled surface may gradually decrease in radial height to a local minimum in radial extent from a surface of the endwall adjacent to the concave profiled surface.

In a related refinement, the local minimum in radial extent may be positioned near the center of the flow passage.

In another refinement, a radial height of the concave profiled surface may increase as the concave profiled surface extends axially and laterally from a local minimum in radial extent of the concave profiled surface to a surface of the endwall adjacent to the concave profiled surface.

In another refinement, the convex profiled surface and the concave profiled surface of the endwall may be configured to direct flow throughout the flow passage.

In another refinement, the first side may be a pressure side of an airfoil.

In yet another refinement, the second side may be a suction side of an airfoil.

These and other aspects and features of the disclosure will become more readily apparent upon reading the following detailed description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
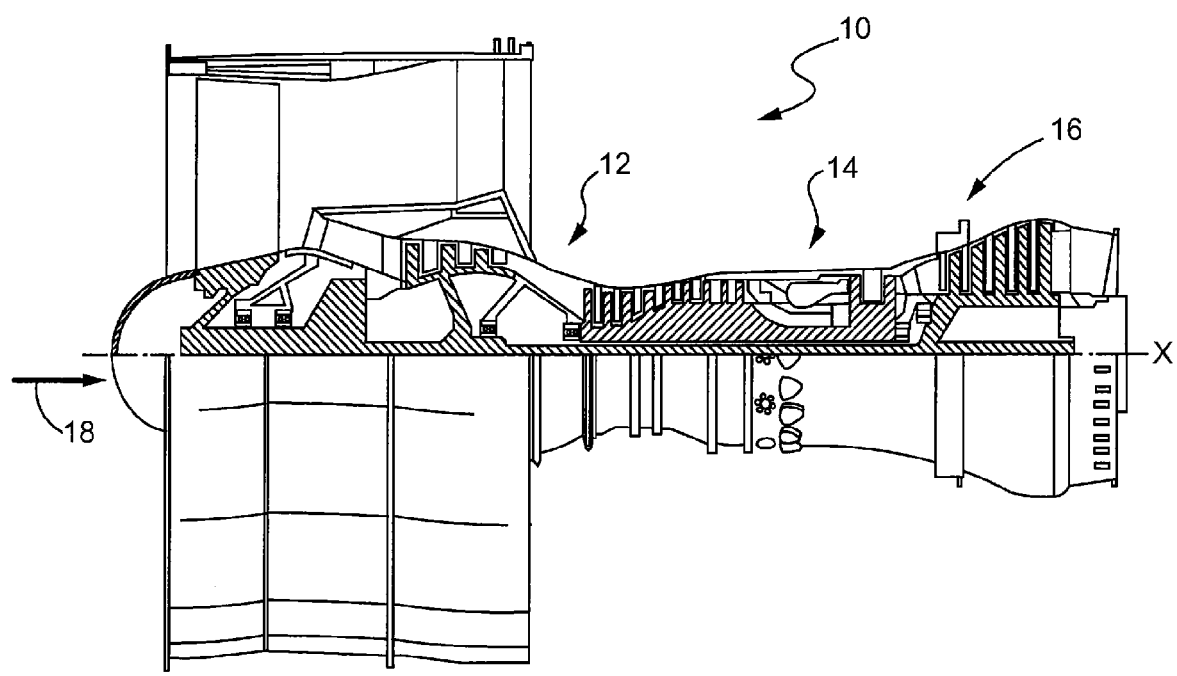
FIG. 1 is a partial sectional view of a gas turbine engine according to one embodiment of the present disclosure.

Referring now to the drawings, and with specific reference to FIG. 1, in accordance with the teachings of the disclosure, an exemplary gas turbine engine 10 is shown. The gas turbine engine 10 may generally comprise a compressor section 12 where air is pressurized, a combustor section 14 downstream of the compressor section 12 which mixes and ignites the compressed air with fuel, thereby generating hot combustion gases, a turbine section 16 downstream of the combustor section 14 for extracting power from the hot combustion gases, and an annular flow path 18 extending axially through each.

The turbine section 16 or the compressor section 12 may include at least one airfoil array 20. As shown best in FIG. 2, the airfoil array 20 may comprise a plurality of airfoils 22 projecting radially from an endwall 24. For example, the airfoils 22 may be provided as a stage of rotor blades or stator vanes in the compressor section 12 or the turbine section 16 of the gas turbine engine 10. The endwall 24 may be either an inner diameter (ID) endwall or an outer diameter (OD) endwall or both. The airfoils 22 may be circumferentially spaced apart on the endwall 24 and arranged about the engine centerline X (FIG. 1), thereby defining a plurality of fluid flow passages 26 between adjacent airfoils 22 with the endwall 24. Each airfoil 22 may have a first side 28 and an opposite second side 30 extending axially in chord between a leading edge 32 and a trailing edge 34. Fluid flow, such as airflow, moves toward the flow passages 26 from a position upstream of the leading edge 32 of the airfoils 22 as the engine 10 operates.

The endwall 24 may have a plurality of convex profiled regions 36 and a plurality of concave profiled regions 38 configured to direct flow through each of the flow passages 26. Illustrated in FIG. 3 with topographic contour lines, the convex profiled region 36 may be located near the leading edge 32 of each of the airfoils 22, and the concave profiled region 38 may be located near a center of each flow passage 26 within the airfoil array 20. Relative to a surface 40 adjacent the convex profiled region 36, the convex region 36 may extend radially inward toward the annular flow path 18.

From the surface 40 adjacent the convex profiled region 36, the convex region 36 may gradually increase in radial height, or move radially inward toward the annular flow path 18, to a local maximum in radial extent 52. The convex profiled region 34 may be axially upstream of and adjacent to the leading edge 32 of the airfoil. The local maximum in radial extent 52 of the convex profiled region 36 may be positioned immediately adjacent to and axially upstream of the leading edge 32 of the airfoil 22. It will be understood that the convex profiled region 36 may extend further than the illustrated contour lines.

Each airfoil 22 may have a chord 42, which is defined as a line from the leading edge 32 to the trailing edge 34, and an axial chord 44, which is a projection of the chord 42 onto a plane containing the engine centerline X. Relevant distances may be expressed as a percentage of the length of the axial chord 44, as shown in the percentage scale at the bottom of FIG. 3. Each fluid flow passage 26 may have a passage width W measured from the first side 28 of each airfoil 22 to the second side 30 of a neighboring airfoil 46. The passage width W may typically vary from a passage inlet 48 to a passage outlet 50 so that the passage width may be locally different at different chordwise locations. Relevant distances may be expressed as a fraction or percentage of the length of the passage width W, with 0% referenced at the first side 28 of each airfoil 22 and 100% referenced at the second side 30 of the neighboring airfoil 46.

The concave profiled region 38 may be generally centered near a middle of each fluid flow passage 26, or mid-chord of the airfoils 22 and mid-passage of the flow passages 26. The concave region 38 of the endwall 24 may extend along a significant length of the axial chord of the airfoils. Relative to a surface 40 adjacent the concave profiled region 38, the concave region 38 may extend radially outward away from the annular flow path 18. From the surface 40 adjacent the concave profiled region 38, the concave region 38 may gradually decrease in radial height, or move outward radially away from the annular flow path 18, to a local minimum in radial extent 54. It will be understood that the concave profiled region 38 may extend further than the illustrated contour lines. Positioned near the center of each flow passage 26, or mid-chord of the airfoils 22 and mid-passage of the flow passages 26, the local minimum in radial extent 54 of the concave profiled region 38 may be disposed within an inclusive axial range of about 30% to about 80% of the axial chord. The local minimum in radial extent 54 of the concave profiled region 38 may also be disposed within an inclusive lateral range of about 30% to about 70% of the passage width.

Figure 2:
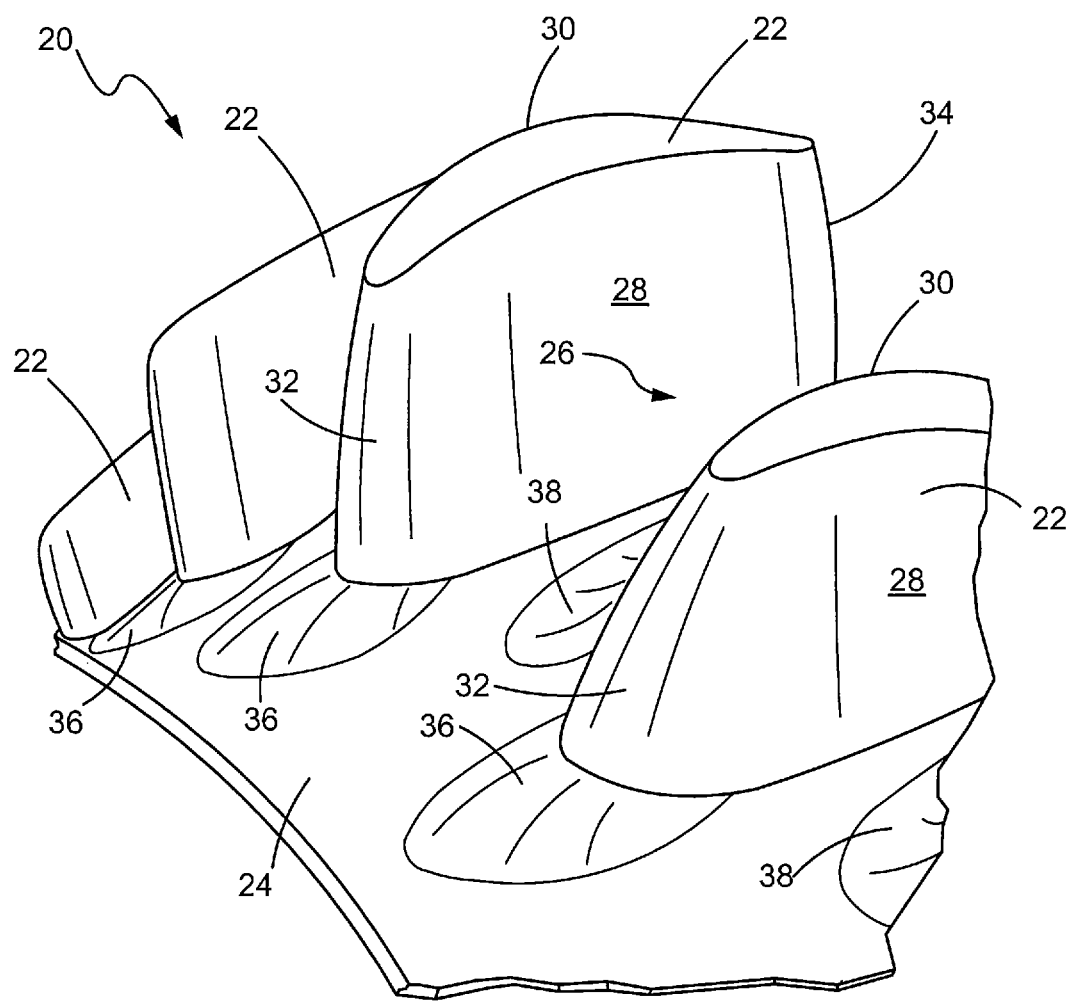
FIG. 2 is a perspective view of an airfoil array within the gas turbine engine of FIG. 1.
Figure 3:
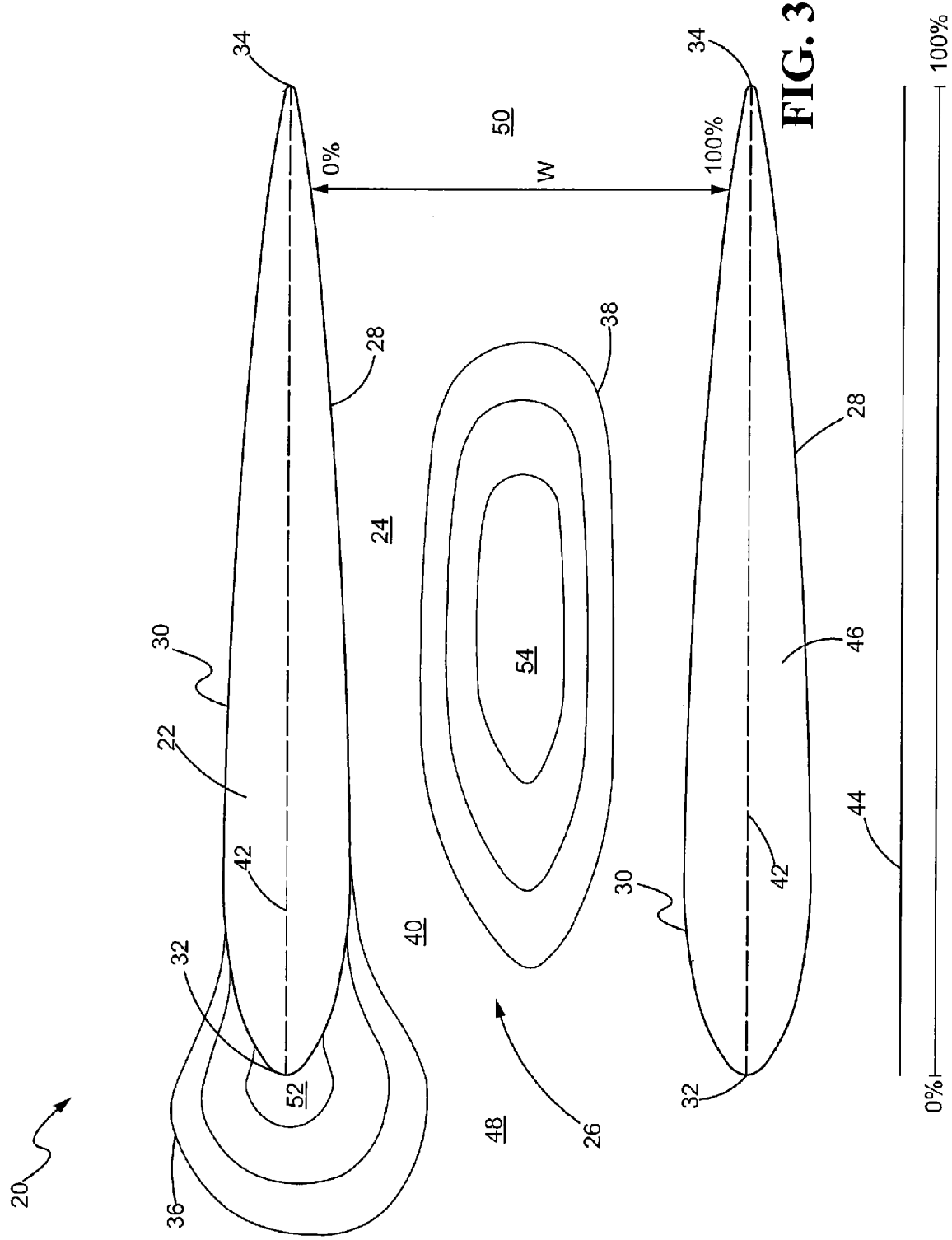
FIG. 3 is a plan view with topographic contours showing a portion of the airfoil array of FIG. 2.

It will be understood that the endwall 24 contouring described herein may be applied to any type of airfoil array 20 without departing from the scope of the invention. According to an exemplary embodiment, the contoured endwall 24 may be applied to an airfoil array 20 with airfoils 22 having a camber or turning airfoil, as shown in FIG. 2. For example, the first side 28 of each airfoil 22 may be a pressure side, and the second side 30 of each airfoil 22 may be a suction side. According to another exemplary embodiment, the contoured endwall 24 may be applied to an airfoil array 20 with airfoils 22 having no camber, as shown in FIG. 3. Such airfoils 22 may be provided, for example, as compressor or turbine blades or vanes, or middle turbine frames in a gas turbine engine.

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The disclosure described provides a way to mitigate or reduce endwall losses in an airfoil array. By positioning a convex profiled region of the endwall adjacent the first side of the airfoils near the leading edge and a concave profiled region of the endwall elongated across the flow passages, the present invention influences flow through the flow passages, thereby reducing endwall losses due to the horseshoe vortex. Furthermore, the contoured endwall described herein results in an improved aerodynamic performance of the airfoil arrays. Such contouring may minimize aerodynamic losses through blade or vane passages of a gas turbine engine, for example, those of a second stage turbine vane. In so doing, this may decrease heat, friction and pressure losses, while improving engine efficiency and life of the blade or vane.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. An airfoil array, comprising:
an endwall;
a plurality of airfoils radially projecting from the endwall, each airfoil having a first side and an opposite second side extending axially in chord between a leading edge and a trailing edge, the airfoils circumferentially spaced apart on the endwall thereby defining a plurality of flow passages between adjacent airfoils;
a convex profiled region extending from the endwall near the leading edge of at least one of said plurality of airfoils; and
a concave profiled region in the endwall near a middle of at least one of said plurality of flow passages, the concave profiled region gradually decreasing in radial height from a surface of the endwall adjacent the concave profiled region to a local minimum in radial extent, the local minimum in radial extent centered mid-chord of the at least one of said plurality of airfoils.

2. The airfoil array of claim 1, wherein the convex profiled region is adjacent to the leading edge of the airfoil.

3. The airfoil array of claim 1, wherein a local maximum in radial extent of the convex profiled region is positioned axially upstream of the leading edge of the airfoil.

4. The airfoil array of claim 1, wherein the local minimum in radial extent of the concave profiled region is disposed and near mid-passage of the flow passage.

5. The airfoil array of claim 1, wherein the concave profiled region extends along a majority of an axial chord of the airfoil.

6. The airfoil array of claim 1, wherein the local minimum in radial extent of the concave profiled region is disposed between about 30% to about 80% of an axial chord.

7. The airfoil array of claim 1, wherein the local minimum in radial extent of the concave profiled region is disposed between about 30% to about 70% of a passage width.

8. The airfoil array of claim 1, wherein the first side is a pressure side of an airfoil.

9. The airfoil array of claim 1, wherein the opposite second side is a suction side of an airfoil.

10. A gas turbine engine, comprising:
a compressor section;
a combustor section downstream of the compressor section; and
a turbine section downstream of the combustor section, one of the compressor section and the turbine section having at least one airfoil array including a plurality of airfoils circumferentially spaced apart and projecting radially from an endwall, the airfoils establishing a plurality of flow passages, each airfoil having a first side, an opposite second side, a leading edge, and a trailing edge, the endwall having a convex profiled surface near the leading edge of at least one of said plurality of airfoils and a concave profiled surface near a center of at least one of said plurality of flow passages, the concave profiled surface gradually decreasing in radial height from a surface of the endwall adjacent the concave profiled surface to a local minimum in radial extent, the local minimum in radial extent centered mid-chord of the at least one of said plurality of airfoils.

11. The gas turbine engine of claim 10, wherein the convex profiled surface gradually increases in radial height to a local maximum in radial extent from a surface of the endwall adjacent to the convex profiled surface.

12. The gas turbine engine of claim 10, wherein a local maximum in radial extent is disposed adjacent to and axially upstream of the leading edge of the airfoil.

13. The gas turbine engine of claim 10, wherein a radial height of the convex profiled surface decreases as the convex profiled surface extends axially upstream from the leading edge of the airfoil.

14. The gas turbine engine of claim 10, wherein the local minimum in radial extent is positioned near the center of the flow passage.

15. The gas turbine engine of claim 10, wherein a radial height of the concave profiled surface increases as the concave profiled surface extends axially and laterally from the local minimum in radial extent of the concave profiled surface to a surface of the endwall that is adjacent to the concave profiled surface.

16. The gas turbine engine of claim 10, wherein the convex profiled surface and the concave profiled surface of the endwall are configured to direct flow throughout the flow passage.

17. The gas turbine engine of claim 10, wherein the first side is a pressure side of an airfoil.

18. The gas turbine engine of claim 10, wherein the opposite second side is a suction side of an airfoil.

\* \* \* \* \*